United States Patent Office 3,543,348
Patented Dec. 1, 1970

3,543,348
INJECTION MOLDING APPARATUS
Frank J. Nussbaum, New York, N.Y., assignor to Bischoff
Chemical Corporation, Hicksville, N.Y.
Filed Aug. 14, 1968, Ser. No. 752,590
Int. Cl. B29f 1/00
U.S. Cl. 18—30                               2 Claims

ABSTRACT OF THE DISCLOSURE

Gas at many atmospheres pressure is dispersed in molten thermoplastic and the resulting compressed plastic foam is stored temporarily in at least one accumulator, each of adjustable volume. During the relatively brief portion of the molding cycle in which thermoplastic flows into a single mold through a plurality of injection nozzles, and expands significantly within the mold, the proportions of plastic foam for each of the nozzles and its adjacent zone of the mold are regulated by adjustable valve means. A plurality of distribution lines direct the flow of the plastic foam from an accumulator to its injection nozzles, adjustable valves regulating the proportions going to each branch of the distribution system. Greater flexibility in the design of the molds is possible because of the plurality of valve controls over the proportions of the injected foam amongst the various distribution lines and nozzles.

BACKGROUND

Figure 1:
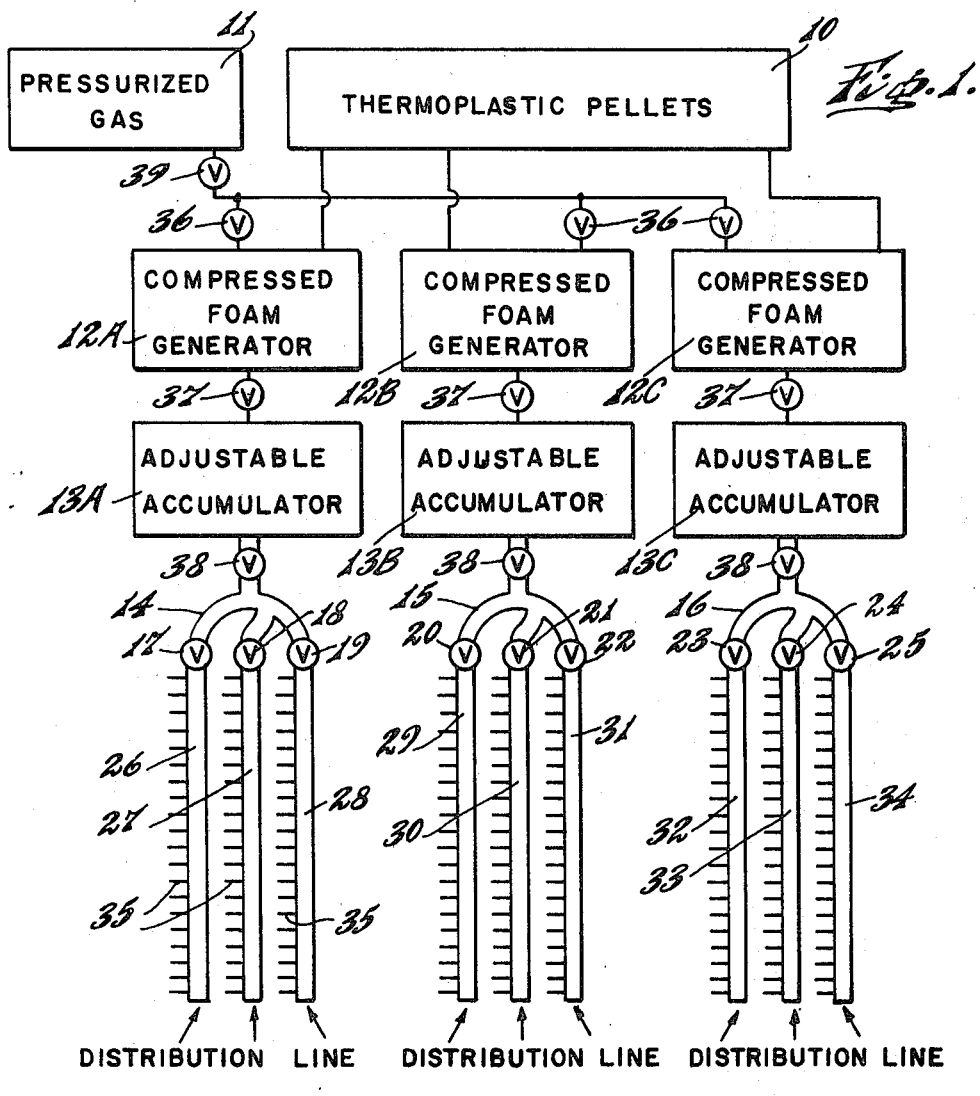

Many approaches toward the injection molding of plastic foam have been described in previous literature. The background technology pertinent to the present invention includes the teachings of Example 6 of Angell 3,268,636, and the teachings of an application of Walter D. Voelker, Ser. No. 716,009, filed Mar. 26, 1968, now 3,512,216 and said example and said co-pending application are deemed reiterated. Gas at superatmospheric pressure is dispersed in molten thermoplastic material, the term molten designating sufficient fluidity to permit such dispersion of the gas. A controlled volume of the dispersion of compressed gas in hot thermoplastic material is forced into an accumulator. After such controlled volume of compressed plastic foam has been forced into the accumulator, the injection nozzles are opened so that the controlled volume of compressed plastic foam flows under pressure from an Angell-type accumulator into the mold through a distribution line and the plurality of injection nozzles. Some previous technologists have sometimes designated as a "melt manifold" what is herein called a "distribution line" to one or more injection nozzles.

The term "mold-filling" designates the brief period of flow of the plastic foam from the injection nozzle into the mold, even though some of the plastic foam may not flow into a remote portion of the mold until during the equilibration period after such mold-filling and prior to removal of the article from the mold. Each injection nozzle functions as an open-shut valve for the flow of plastic foam. All of the injection nozzles are conventionally actuated to open by the attainment of a predetermined volume in their accumulator and to close when a predetermined volume has flowed from such accumulator. Rapid mold-filling is achieved partly because the thermalplastic material is hot enough to be forced through the injection nozzles, but particularly because, at the beginning of the mold-filling step, there is a significant pressure difference between the accumulator and the mold. Any attempt to shorten the mold-filling time by increasing the temperature of the thermalplastic material encounters the danger of thermal degradation of the polymer, but shortening the mold-filling time by increasing the gas pressure (and thus the pressure differential forcing the plastic foam to flow from the accumulator to the outlets of the injection nozzles) does not encounter such a limitation.

Injection molding of relatively small plastic foam articles helped to establish the economic attractiveness of the procedure. Efforts to prepare relatively large articles were initially discouraged because of the view that only the smallness of the article permitted the process to be controlled. Plastic foam tends to cool and solidify as it spreads from the injection nozzle through the relatively cool mold. If production is designed so that a pair of nozzles provide waves of plastic foam which merge and blend prior to solidification, and if sometimes the partial solidification of some of the foam occurs prior to the blending, then reliable production is not possible. Scale up of the apparatus cannot be accomplished by merely enlarging the orifice diameters of the injection nozzles. By the provision of an adequate number of injection nozzles to assure complete filling of the mold without hardening of the advancing wave of injected foam, larger articles have been molded than was feasible in 1963.

Slow moving streams of a fluid such as water, having uniform viscosity, can be reliably proportioned by manifolding systems, but significant inaccuracies and random variations amongst repetitive operations are involved in the control of compressible, expandable plastic foam undergoing simultaneously changes of pressure, changes of temperature, and changes of viscosity during flow. Although it has been feasible to achieve repetitive reproducibility of the storage of a controlled volume of plastic foam in the accumulators just prior to the mold-filling step, and although the period of time during which the plastic foam is injected is reproducible, there have been significant differences between the weight of plastic foam deposited in a zone of a mold in successive operations as a result of the random differences of flow of the material from the nozzles into the remote and merging portions of the mold or molds, during the brief period of mold-filling. Sometimes the filling of a mold with plastic foam has been described as partaking of the nature of an explosion of the plastic foam into the mold. The brief duration of the mold-filling step relying upon the large pressure differential between the accumulator and mold in the Angell-type process further accentuated the tendency to emphasize the explosiveness characteristics and to ignore the flowing stream properties of the plastic foam. Expert engineers have predicted that it would be difficult to regulate the proportions of flow of explosively expanding plastic foam. Injection molding of plastic foam has been recommended for relatively small articles of uniform thickness, but attempts at preparing large articles of complicated shape, varying thickness, and/or heavy weight by injection molding of plastic foam have been discouraged by the difficulties attributable to filling reproducibly the various zones of the mold with a controlled weight of plastic foam.

SUMMARY

In accordance with the present invention, a plurality of adjustable valves are provided for regulating the proportioning of the flow of the plastic foam from the accumulator to the plurality of filling orifices in the single mold. Reliable filling of the single mold with commerically aceptable standards of reproducible weight of plastic foam is achieved by reason of the pluarity of valves. Adjustable valves are positioned both at the injection nozzles and at each branch of a manifold. The distribution line manifold divides the flow from the accumulator to various branches of the distribution line system.

The injection nozzles are supplied with plastic foam through a plurality of melt manifolds, and an adjustable feeding device distributes and proportions the flow of the plastic foam from a single accumulator to the multiple melt manifolds.

In the molding of large articles, the optimum amount of plastic foam to be supplied by each injection nozzle is calculated, together with the tolerance range, by the engineer designing the mold. Prior to actually attempting to mold the article, the valves are adjusted so that the weight of foam discharged from each nozzle is within the tolerance range. Notwithstanding the explosiveness of the filling operation and the compressibility of the plastic foam, the present invention permits achievement of satisfactory reproducibility of the amount directed to a particular nozzle. Structural plastics made by injection molding have a pore volume which is within a relatively wide range and there can be variations in the pore volume of different zones of the article. Engineering for injection molding of structural plastic articles has significant flexibility because of the acceptability of slight differences in the density of various zones of the molded article. Moreover, the back pressure exerted by the merging of waves of advancing foam from different injection nozzles favorably affects the flow to promote more uniform density of the foam throughout the mold. Temperatures are so controlled that pressures and densities of core portions of the article are equilibrated during the period subsequent to the mold-filling, and the duration of this equilibration period within the completely filled mold is ordinarily greater than the duration of the mold-filling operation. That is, it takes longer for the core of a relatively large article to solidify than it takes for the initial injection of plastic foam into the mold. The availability of the plurality of adjustable valves, both for the nozzles and for the distribution lines and manifolds system, permits sufficient flexibility of control of the flow patterns that commercially acceptable molded articles are prepared.

GENERAL DESCRIPTION

Figure 2:
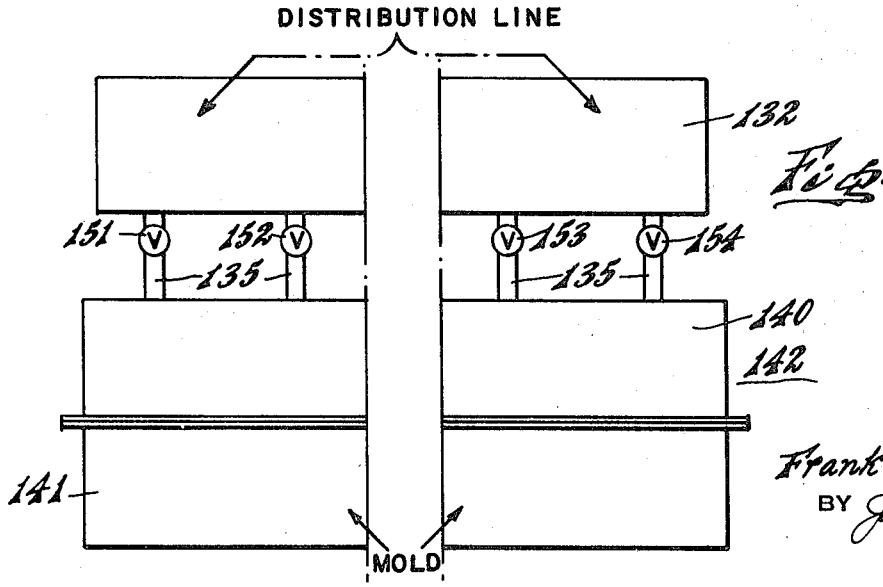

The nature of the invention is further clarified by reference to the accompanying drawings, in which FIG. 1 is a schematic flow sheet of the combination of a plurality of distribution lines having adjustable valves modifying the proportioning of the flow of the plastic foam in the system of multiple manifolds. FIG. 2 is a schematic showing of the manner in which a distribution line transmits plastic foam to a split single mold through a plurality of injection nozzles.

Pressurized gas such as nitrogen at about 200 atmospheres is dispersed in flowable hot thermoplastic material (e.g. polyethylene) and directed into accumulators. As shown in the drawings, thermoplastic pellets flow from a supply source 10 into compressed foam generators 12A, 12B, and 12C. It is sometimes appropriate to employ a single foam generator supplying multiple accumulators instead of using the schematically shown multiple generators. Each foam generator is also connected with a supply of pressurized gas 11, shown schematically as a single source. Important advantages are achieved by reason of such single source of pressurized gas and the interconnections of all of the foam generators to such single source of pressurized gas. The compressed foam generators may be of any type, such as mixers adapted to disperse gas into the thermoplastic melt.

Each of adjustable accumulators 13A, 13B, and 13C, is adapted to receive from a generator the volume of hot compressed foam for which it is adjusted. The accumulators are filled during the portion of the operating cycle subsequent to the previous mold filling step. The previously molded article is cooling from the molten to the solid state and is being removed from the mold during a portion of the time the accumulators are being filled. After the mold is ready to receive the hot plastic foam, the accumulators 13A, 13B, and 13C simultaneously discharge the hot plastic foam. Ordinarily the volume of plastic foam in an accumulator provides the signals for both opening and closing the shut-off valve portions of the injection nozzles.

Particular attention is directed to manifolds 14, 15, and 16, which divide the flow from each single accumulator into a plurality of branch streams, and to the valves 17, 18, 19, 20, 21, 22, 23, 24 and 25, which regulate the flow of the stream leaving each branch of a manifold. Prior to the start-up of the mold-filling step, the system from each accumulator to its injection nozzles contains the compressed hot plastic foam residue not discharged during the previous mold filling step. This zone is maintained at high pressure and at a uniform hot temperature. Thermal insulation and electrical heating throughout the zones in which the thermoplastic is maintained in a molten state is conventional in thermoplastic molding apparatus and hence is not shown in the schematic drawings.

The plastic foam flows from the manifolds 14, 15, and 16 and through valves 17–25 into a plurality of distribution lines 26, 27, 28, 29, 30, 31, 32, 33, and 34. Injection nozzles 35 are supplied by the plurality of distribution lines 26–34. Suitable supplemental control means, shown schematicaly as valving 36, 37, and 38, may be employed if desired for supplemental regulation of the flow of the gas and/or compressed foam into foam generators, adjustable accumulators, and/or manifolds. If a common single source of pressurized gas for a plurality of foam generators is employed, then a master valve 39 for the gas supply is advantageous. As previously noted, precise regulation of gas pressure source is a significant feature of Angell-type methods.

As shown in FIG. 2, each of the distribution lines directs the flow of plastic foam to a plurality of injection nozzles, indicated schematically as 135. An upper portion 140 fits upon a lower portion 141 to provide a mold 142 into which the hot plastic foam is injected by the plurality of injection nozzles 135. After the hot plastic foam has been injected into the cavity in the mold 142 and the waves of hot plastic foam from adjacent nozzles have merged to provide a single mass of hot plastic foam within the cavity of the mold, the injection nozzles are purged of the hot plastic foam as the nozzle returns to its normally closed position. The duration of the period of equilibration during which the pressure and density adjustments are made within various portions of the core of the mass of plastic foam within the mold cavity is believed to be ordinarily greater than the duration of the filling operation. The plastic foam cools, initially at the surface of the mold, and eventually at the core of the article. The solidified article is removed from the mold after the article has the strength appropriate for transfer to a subsequent stage of manufacture. The bottom portion 141 of the split single mold 142 is generally lowered to permit such removal of the article from the generally fixed upper portion 140 of the mold.

In addition to the shut-off valve function, each injection nozzle 135 is provided with an adjustable valve, shown schematically as 151, 152, 153, 154, etc., whereby the stream of hot plastic foam flowing in a distribution line can be proportioned amongst the various injection nozzles fed by such distribution line. The single mold is filled with a batch of hot plastic foam. The proportion of the batch which is deposited in a zone adjacent a particular nozzle is dependent upon the proportioning accomplished by the adjustments of the accumulators, 13, upon the proportioning accomplished by the manifolds, 14–16, upon the proportioning accomplished by the valves 17–25 for the distribution lines, and upon the proportioning attributable to the adjustable valves 151–154 for the injection nozzles. The plurality of controls permits a very significant degree of flexibility in achieving the desired proportioning of the foam throughout various zones of the single mold.

In the operation of the apparatus and method of the present invention, the engineer designing a mold sets forth the optimum weight of foam to be delivered by each designated injection nozzle, as well as the permissible variation therefrom. In the start-up of the use of such mold, the performance characteristics of the proportioning system are adjusted prior to the preliminary molding of an article. The accumulators are discharged into weighing vessels, and the valves are adjusted until each injection nozzle is discharging a weight of foam within the limits designated by the specifications. Sectional cuts are made in the initial test articles to obtain evidence for further adjustments, if any, of the valves to assure satisfactory proportioning of the plastic foam throughout the single mold. The plastic foam employed in such start-up procedures can be rerun. Such utilization of scrap foam is one of the significant advantages of injection molding of plastic foam.

It should be noted that in certain operations the distribution line valves 17, 18, 19 will be adjusted to each have more resistance to flow of the plastic than the marginal difference in resistance to flow attributable to the cumulative effect of the adjustable valves 151–154, etc., on each of the distribution lines 26–28. The feasibility of increasing the pressure of the gas supply helps to compensate for the problems attributable to such increase of resistance to flow. The end results of reproducible proportioning of the quasi-explosive discharge of the plastic foam from the nozzles into the mold is surprising and unobvious to technologists familiar with the engineering standards previously dominant in Angell-type methods.

The invention claimed is:

1. In plastic foam injection apparatus in which gas at a pressure of many atmospheres is dispersed in flowable thermoplastic composition to provide plastic foam, and in which said plastic foam flows from an accumulator to a plurality of injection nozzles through a distribution line, and from the injection nozzles into a mold during a brief period of opening of the injection nozzles, the plastic foam expanding and cooling in the mold, from which the plastic foam article is removed, the improvement which consists essentially of:

a single source of pressurized gas;
at least one compressed foam generator;
at least one accumulator, each accumulator being adapted to receive compressed foam from a foam generator, and each accumulator being adjustable for the accumulation of a selected volume of plastic foam;
at least one manifold, each manifold directing plastic foam from its accumulator to a plurality of distribution lines;
a plurality of distribution lines;
a plurality of injection nozzles supplying a single mold with plastic foam;
adjustable valve means whereby the proportions of the streams from an accumulator through the branches of its manifold to its distribution lines can be regulated; and
at least one injection nozzle on each distribution line, each injection nozzle having independent adjustable valve means adapted to permit adjustment of the quantity of plastic foam injected into the mold by such nozzle,
whereby the proportions of plastic foam directed to the zone in said single mold near each of said plurality of nozzles may be regulated by a plurality of adjustments of the adjustable valves.

2. Apparatus of claim 1 in which the resistance to flow imposed by each of the adjustable valve means for each branch of a distribution line is significantly greater than the differences in resistance amongst the distribution lines attributable to the adjustable valves of the injection nozzles.

References Cited
UNITED STATES PATENTS

| 3,218,375 | 11/1965 | Hardwick | 264—51 |
| 3,268,636 | 8/1966 | Angell | 264—51 |
| 3,428,720 | 2/1969 | Denslow. | |

H. A. KILBY, Jr., Primary Examiner

U.S. Cl. X.R.

264—51